United States Patent
Yokoyama et al.

(10) Patent No.: US 9,559,382 B2
(45) Date of Patent: Jan. 31, 2017

(54) NONAQUEOUS ELECTROLYTE SECONDARY BATTERY

(71) Applicant: SANYO Electric Co., Ltd., Moriguchi-shi, Osaka (JP)

(72) Inventors: Yoshinori Yokoyama, Itano-gun (JP); Yasuhiro Yamauchi, Sumoto (JP)

(73) Assignee: SANYO Electric Co., Ltd., Daito-shi (JP)

( * ) Notice: Subject to any disclaimer, the term of this patent is extended or adjusted under 35 U.S.C. 154(b) by 208 days.

(21) Appl. No.: 13/961,921

(22) Filed: Aug. 8, 2013

(65) Prior Publication Data

US 2014/0045015 A1   Feb. 13, 2014

(30) Foreign Application Priority Data

Aug. 9, 2012 (JP) ................................. 2012-177288

(51) Int. Cl.
*H01M 10/0567* (2010.01)
*H01M 10/04* (2006.01)
(Continued)

(52) U.S. Cl.
CPC ......... *H01M 10/0567* (2013.01); *H01M 2/263* (2013.01); *H01M 4/13* (2013.01);
(Continued)

(58) Field of Classification Search
CPC ..................... H01M 10/0409; H01M 10/0431; H01M 10/125; H01M 10/286; H01M 10/0567; H01M 10/0587; H01M 2/263; H01M 4/13
See application file for complete search history.

(56) References Cited

U.S. PATENT DOCUMENTS

| 5,773,164 A * | 6/1998 | Venkatesan .......... H01M 2/1011 429/161 |
| 2011/0052971 A1 * | 3/2011 | Fujikawa ................ H01M 2/22 429/161 |

(Continued)

FOREIGN PATENT DOCUMENTS

CN   101914110 A  *  12/2010
EP    2061115 A1  *   5/2009
(Continued)

OTHER PUBLICATIONS

Machine translation of CN 101914110 A.*

*Primary Examiner* — Miriam Stagg
*Assistant Examiner* — Brian Ohara
(74) *Attorney, Agent, or Firm* — Westerman, Hattori, Daniels & Adrian, LLP

(57) ABSTRACT

A nonaqueous electrolyte secondary battery includes a flat winding electrode assembly including a positive electrode substrate exposed portion on one end and a negative electrode substrate exposed portion on the other end. The winding numbers of the positive and the negative electrode substrate exposed portions are each 30 or more. The positive and negative electrode substrate exposed portions each have an outermost surface welded and connected with a positive and a negative electrode collectors, respectively. A nonaqueous electrolyte used to fabricate the battery contains a lithium salt having an oxalate complex as an anion. At the welded connection portions, all of the layers of the positive electrode substrate exposed portion are melted to be welded and connected to the positive electrode collector, and all of the layers of the negative electrode substrate exposed portion are melted to be welded and connected to the negative electrode collector.

20 Claims, 5 Drawing Sheets

(51) Int. Cl.
    *H01M 10/0587*    (2010.01)
    *H01M 2/26*       (2006.01)
    *H01M 4/13*       (2010.01)

(52) U.S. Cl.
    CPC ... *H01M 10/0431* (2013.01); *H01M 10/0587* (2013.01); *Y02E 60/122* (2013.01)

(56) References Cited

U.S. PATENT DOCUMENTS

| | | | |
|---|---|---|---|
| 2011/0052976 A1* | 3/2011 | Ishii et al. | 429/178 |
| 2011/0195287 A1* | 8/2011 | Kamifuji | H01M 2/263 429/94 |
| 2011/0195288 A1* | 8/2011 | Harima | H01M 10/0431 429/94 |

FOREIGN PATENT DOCUMENTS

| | | |
|---|---|---|
| JP | 3439085 B2 | 8/2003 |
| JP | 2007-165125 A | 6/2007 |
| JP | 2007-180015 A | 7/2007 |
| JP | 2009-129541 A | 6/2009 |
| JP | 2010-108624 A | 5/2010 |
| JP | 2010-531856 A | 9/2010 |
| WO | 2012/057335 A1 | 5/2012 |

* cited by examiner

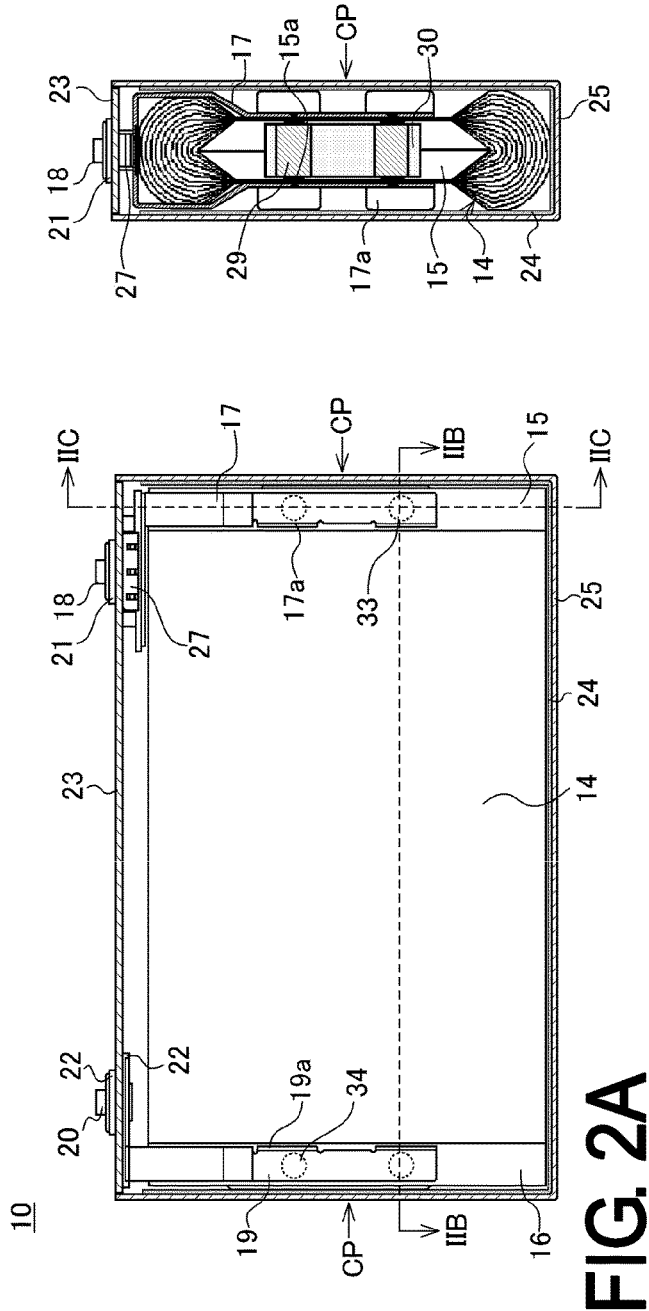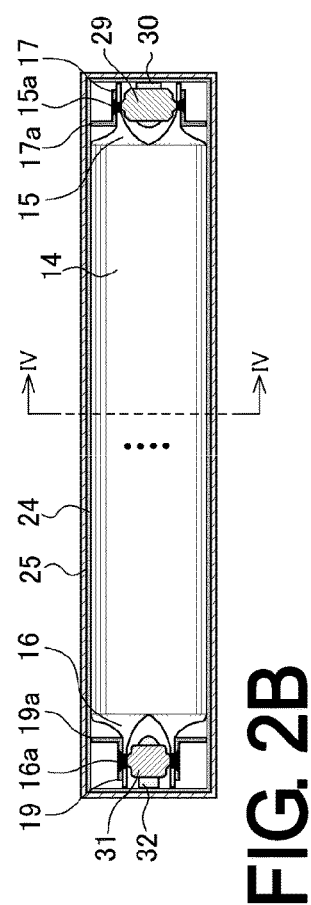

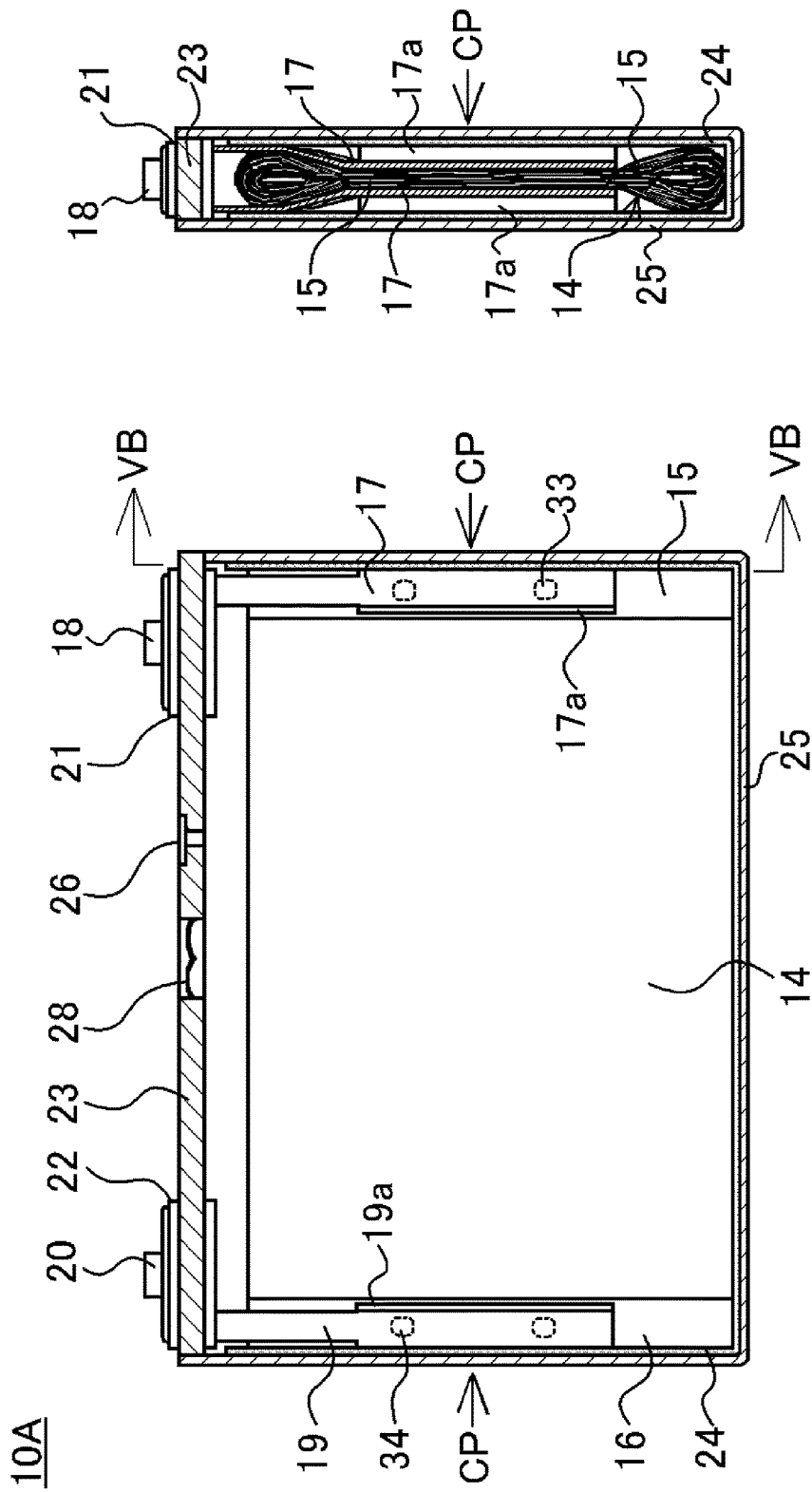

NONAQUEOUS ELECTROLYTE SECONDARY BATTERY

TECHNICAL FIELD

The present invention relates to a nonaqueous electrolyte secondary battery that has excellent cycling characteristics.

BACKGROUND ART

Alkaline secondary batteries typified by nickel-hydrogen batteries and nonaqueous electrolyte secondary batteries typified by lithium ion batteries have been widely used as a power supply for driving portable electronic equipment, such as cell phones including smartphones, portable personal computers, PDAs, and portable music players. In addition, alkaline secondary batteries and nonaqueous electrolyte secondary batteries have been widely used as a power supply for driving electric vehicles (EVs) and hybrid electric vehicles (HEVs and PHEVs), and in stationary storage battery systems for suppressing output fluctuation of solar power generation and wind power generation, for example, and for a peak shift of system power that utilizes the power during the daytime while saving the power during the nighttime.

The use of EVs, HEVs, and PHEVs or the stationary storage battery system especially requires high capacity and high output characteristics. The size of each battery is therefore increased, and a plurality of batteries are connected in series or in parallel for use. Therefore, nonaqueous electrolyte secondary batteries have been generally used for these purposes in view of space efficiency. When physical strength is needed, a metal prismatic outer body with one side open, and a metal sealing plate for sealing this opening are generally adopted as an outer body of a battery.

Increasing longevity is essential in nonaqueous electrolyte secondary batteries used for the above-mentioned purposes. Therefore, various additives are added to a nonaqueous electrolyte in order to prevent degradation. For example, JP-A-2009-129541 discloses that, in a nonaqueous electrolyte secondary battery, a cyclic phosphazene compound and various salts having an oxalate complex as an anion are added to a nonaqueous electrolyte. JP-T-2010-531856 and JP-A-2010-108624 describe the addition of lithium bis(oxalato)borate (Li[B(C$_2$O$_4$)$_2$], hereinafter referred to as "LiBOB"), which is a lithium salt having an oxalate complex as an anion, as represented by the following structural formula (I).

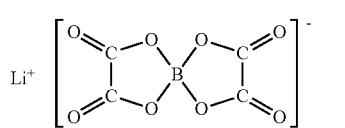

(I)

For example, Japanese Patent No. 3439085 discloses the invention of a nonaqueous electrolyte secondary battery in which lithium difluorophosphate (LiPF$_2$O$_2$) is added to a nonaqueous electrolyte in order to prevent self-discharge at charge storage and improve storage characteristics after charging.

When a cyclic phosphazene compound and various salts having an oxalate complex as an anion disclosed in JP-A-2009-129541 are added to the nonaqueous electrolyte, fire resistance of the nonaqueous electrolyte is improved, which can provide a nonaqueous electrolyte secondary battery having excellent battery characteristics and high safety. When LiBOB disclosed in JP-T-2010-531856 and JP-A-2010-108624 is added to a nonaqueous electrolyte, a protective layer including a lithium ion conductive layer that is thin and extremely stable is formed on the surface of a carbon negative electrode active material of the nonaqueous electrolyte secondary battery. This protective layer is stable even in a high temperature, consequently preventing the carbon negative electrode active material from decomposing the nonaqueous electrolyte. This leads to an advantage of providing excellent cycling characteristics and improving the safety of a battery.

In the nonaqueous electrolyte secondary battery disclosed in Japanese Patent No. 3439085, LiPF$_2$O$_2$ and lithium react with each other to form a high-quality protective covering onto an interface of a positive electrode active material and a negative electrode active material. This protective covering prevents direct contact between an active material in a state of charge and an organic solvent, thereby preventing decomposition of the nonaqueous electrolyte due to contact between the active material and the nonaqueous electrolyte. Consequently, an advantageous function effect of improving charge storage characteristics can be attained.

A nonaqueous electrolyte secondary battery having high capacity and high output characteristics uses not only a positive electrode and a negative electrode with a large width, and a separator, but also a flat winding electrode assembly produced by winding these many times.

A problem has been found in that a reaction inside an electrode is likely to occur in a non-uniform manner in a winding electrode assembly including a positive electrode with a large width and a negative electrode with a large width. In the nonaqueous electrolyte secondary battery, a lithium salt having an oxalate complex as an anion is added to a nonaqueous electrolyte in order to improve cycling characteristics. However, when the reaction inside the electrode occurs in a non-uniform manner, a protective covering derived from the lithium salt having the oxalate complex as an anion is less likely to be formed uniformly on the surface of the negative electrode, and the cycling characteristics are less likely to be improved.

SUMMARY

An advantage of some aspects of the invention is to provide a nonaqueous electrolyte secondary battery that has excellent cycling characteristics even if a winding electrode assembly including a positive electrode with a large width and a negative electrode with a large width is used.

A nonaqueous electrolyte secondary battery of an aspect of the invention includes: a flat winding electrode assembly formed by winding an elongated positive electrode and an elongated negative electrode with an elongated separator interposed therebetween; and an outer body storing the flat winding electrode assembly and a nonaqueous electrolyte. The flat winding electrode assembly includes a positive electrode substrate exposed portion wound on one end and a negative electrode substrate exposed portion wound on the other end. The winding number of the wound positive electrode substrate exposed portion is 30 or more, and the winding number of the wound negative electrode substrate exposed portion is 30 or more. The wound positive electrode substrate exposed portion has an outermost surface welded and connected with a positive electrode collector, and the wound negative electrode substrate exposed portion has an outermost surface welded and connected with a negative electrode collector. The nonaqueous electrolyte contains a lithium salt having an oxalate complex as an anion at the time of making the nonaqueous secondary battery. All of the layers of the positive electrode substrate exposed portion are melted at the welded connection portion between the positive electrode substrate exposed portion and the positive electrode collector to be welded and connected to the positive electrode collector. All of the layers of the negative electrode substrate exposed portion are melted at the welded connection portion between the negative electrode substrate exposed portion and the negative electrode collector to be welded and connected to the negative electrode collector.

When the nonaqueous electrolyte contains a lithium salt having an oxalate complex as an anion at the time of making the nonaqueous electrolyte second battery, a protective covering that is stable even in a high temperature is formed on the surface of the negative electrode due to a reaction between the lithium salt having an oxalate complex as an anion and a negative electrode active material. This prevents the negative electrode active material from decomposing the nonaqueous electrolyte, thereby providing excellent cycling characteristics and improving the safety of the battery. In the nonaqueous electrolyte secondary battery of the invention, the winding numbers of the positive electrode and the negative electrode in the flat winding electrode assembly are each 30 or more. In other words, the numbers of stacked layers of the positive electrode and the negative electrode are each 60 or more. This provides a nonaqueous electrolyte secondary battery that can easily achieve high capacity and high output characteristics.

In the nonaqueous electrolyte secondary battery of the invention, the wound positive electrode substrate exposed portion has an outermost surface welded and connected with a positive electrode collector, and the wound negative electrode substrate exposed portion has an outermost surface welded and connected with a negative electrode collector. Furthermore, all of the layers in the stacked direction of the positive electrode substrate exposed portion are melted at the welded connection portion between the positive electrode substrate exposed portion and the positive electrode collector to be welded and connected to the positive electrode collector, and all of the layers in the stacked direction of the negative electrode substrate exposed portion are melted at the welded connection portion between the negative electrode substrate exposed portion and the negative electrode collector to be welded and connected to the negative electrode collector. In other words, all of the stacked layers of the positive electrode substrate exposed portion and the negative electrode substrate exposed portion are each melted and integrated at the welded connection portion. Even in the nonaqueous electrolyte secondary battery including the flat winding electrode assembly that has a large winding number, this structure allows a reaction in the electrode to proceed uniformly on the winding start side and on the winding end side of the winding electrode assembly. Thus, a protective covering derived from the lithium salt having the oxalate complex as an anion is formed uniformly on the surface of the negative electrode, and the nonaqueous electrolyte secondary battery can be obtained that has more excellent cycling characteristics. In addition, even if the nonaqueous electrolyte penetrates the positive electrode substrate exposed portion or the negative electrode substrate exposed portion, resistance in the positive electrode substrate exposed portion or the negative electrode substrate exposed portion at the welded connection portion is less likely to change. Whether all of the stacked layers of the positive electrode substrate exposed portion or the negative electrode substrate exposed portion are melted at the welded connection portion can be confirmed by breaking down the welded connection portion after resistance-welding and examining a weld mark formed at the time of resistance-welding.

A compound capable of reversibly absorbing and desorbing lithium ions may be selected to be used as appropriate as the positive electrode active material that can be used in the nonaqueous electrolyte secondary battery of the invention. Such electrode active materials include lithium transition-metal composite oxides that are represented by $LiMO_2$ (M is at least one of Co, Ni, and Mn) and are capable of reversibly absorbing and desorbing lithium ions, namely, $LiCoO_2$, $LiNiO_2$, $LiNi_yCo_{1-y}O_2$ (y=0.01 to 0.99), $LiMnO_2$, $LiCo_xMn_yNi_zO_2$ (x+y+z=1), $LiMn_2O_4$, or $LiFePo_4$. Such lithium transition-metal composite oxides may be used alone, or two or more of them may be mixed to be used. Furthermore, lithium cobalt composite oxides with different metal element such as zirconium, magnesium, and aluminum added thereto may be used as well.

The following shows examples of a nonaqueous solvent that can be used for the nonaqueous electrolyte in the nonaqueous electrolyte secondary battery of the invention: a cyclic carbonate such as ethylene carbonate (EC), propylene carbonate (PC), and butylene carbonate (BC); a fluorinated cyclic carbonate; a cyclic carboxylic ester such as γ-butyrolactone (γ-BL) and γ-valerolactone (γ-VL); a chain carbonate such as dimethyl carbonate (DMC), ethyl methyl carbonate (EMC), diethyl carbonate (DEC), methylpropyl carbonate (MPC), and dibutyl carbonate (DBC); fluorinated chain carbonate: a chain carboxylic ester such as methyl pivalate, ethyl pivalate, methyl isobutyrate, and methyl propionate; an amide compound such as N,N'-dimethylformamide and N-methyl oxazolidinone; and a sulfur compound such as sulfolane. It is desirable that two or more of them be mixed to be used.

In the nonaqueous electrolyte secondary battery of the invention, the lithium salt that is commonly used as an electrolyte salt for an nonaqueous electrolyte secondary battery may be used as the electrolyte salt dissolved in the nonaqueous solvent. Examples of such a lithium salt are as follows: $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures of these substances. In particular, among them, it is preferable that $LiPF_6$ (lithium hexafluorophosphate) be used. The amount of dissolution of the electrolyte salt with respect to the nonaqueous solvent is preferably from 0.8 to 1.5 mol/L.

In the nonaqueous electrolyte secondary battery of the invention, the lithium salt having the oxalate complex as an anion is preferably contained in the nonaqueous electrolyte in an amount of 0.01 to 2.0 mol/L, more preferably from 0.05 to 0.2 mol/L at the time of making the nonaqueous electrolyte secondary battery. In the nonaqueous electrolyte secondary battery of the invention, the additive amount of the lithium salt having the oxalate complex as an anion in the nonaqueous electrolyte may be added as the electrolyte salt whose principal element is the lithium salt having the oxalate complex as an anion. However, a large additive amount of the lithium salt having the oxalate complex as an anion in the nonaqueous electrolyte increases the viscosity of the nonaqueous electrolyte. Therefore, various electrolyte salts as above may be used as principal elements, and the lithium salt having the oxalate complex as an anion may be added as an additive substance in a small amount, for example, about 0.1 mol/L. When the lithium salt having the oxalate complex as an anion is added as the additive substance, depending on the additive amount thereof, all of the lithium salt having the oxalate complex as an anion may be consumed for forming the protective covering at the initial charge, resulting in a case in which no lithium salt having the oxalate complex as an anion remains substantially in the nonaqueous electrolyte. The invention also includes this case. Thus, the invention includes any case in which the nonaqueous electrolyte of the nonaqueous electrolyte secondary battery before the initial charge contains the lithium salt having the oxalate complex as an anion.

In the nonaqueous electrolyte secondary battery of the invention, it is preferable that the welded connection portion between the positive electrode substrate exposed portion and the positive electrode collector be provided at least at one point on each of both sides across the winding central position of the flat winding electrode assembly, and that the welded connection portion between the negative electrode substrate exposed portion and the negative electrode collector be provided at least at one point on each of both sides across the winding central position of the flat winding electrode assembly.

Such a structure has the welded connection portion formed on both sides (on a sealing plate side and the bottom portion side of the outer body) across the winding central position of the flat winding electrode assembly. Therefore, the electrode reaction is likely to proceed uniformly over the whole flat winding electrode assembly, and the above-mentioned effect can be successfully attained.

In the nonaqueous electrolyte secondary battery of the invention, it is preferable that the positive electrode substrate exposed portion have a melting area of 2.7 mm² or more in a plane passing through the central axis of the welded connection portion and being perpendicular to the winding axis of the winding electrode assembly within the welded connection portion with the positive electrode collector.

Furthermore, it is preferable that the negative electrode substrate exposed portion have a melting area of 1.8 mm² or more in a plane passing through the central axis of the welded connection portion and being perpendicular to the winding axis of the winding electrode assembly within the welded connection portion with the negative electrode collector.

In the nonaqueous electrolyte secondary battery, the positive electrode collector and the positive electrode substrate are usually formed using aluminum or an aluminum alloy, and the negative electrode collector and the negative electrode substrate are usually formed using copper or a copper alloy. Copper or a copper alloy has a higher melting point, higher hardness, and higher strength than aluminum or an aluminum alloy. Thus, the melting area of the positive electrode substrate exposed portion is made larger than that of the negative electrode substrate exposed portion to allow mechanical strength of the welded connection portion of the positive electrode to be almost equal to that of the welded connection portion of the negative electrode.

In the nonaqueous electrolyte secondary battery of the invention, it is preferable that the wound positive electrode substrate exposed portion and the wound negative electrode substrate exposed portion be each divided into two segments, that the two segments of the wound positive electrode substrate exposed portion be disposed so that a positive electrode conductive member is arranged therebetween, and that the two segments of the wound negative electrode substrate exposed portion be disposed so that a negative electrode conductive member is arranged therebetween. In such a case, it is preferable that a plurality of positive electrode conductive members be held in one positive electrode intermediate member with electric insulating properties, and that a plurality of negative electrode conductive members be held in one negative electrode intermediate member with electric insulating properties.

Such a structure enables the two segments of the substrate exposed portion, the conductive member, and a collector to be connected at a time by the series resistance welding method, and allows the resistance welding to be performed so as to form a weld mark passing through each stacked portion of the two segments of the substrate exposed portion. Therefore, less current is needed for the resistance welding, compared to the case where the resistance welding is performed so as to form a weld mark passing through the whole stacked portion of the non-divided positive electrode substrate exposed portion or negative electrode substrate exposed portion. In addition, a plurality of conductive members on the positive electrode side and the negative electrode side are each held in one intermediate member with electric insulating properties. This allows the conductive members to be stably positioned and disposed between the two segments of the substrate exposed portion, and improves the quality of the resistance welded portion to achieve low resistance.

In the nonaqueous electrolyte secondary battery of the invention, the battery preferably has a capacity of 20 Ah or more.

When the battery capacity is 20 Ah or more, the winding numbers of the positive electrode and the negative electrode are large. Therefore, the above-mentioned effect of the invention can be seen better.

In the nonaqueous electrolyte secondary battery of the invention, it is preferable that the lithium salt having the oxalate complex as an anion be lithium bis(oxalato)borate ($Li[B(C_2O_4)_2]$, hereinafter referred to as "LiBOB").

Using LiBOB as the lithium salt having the oxalate complex as an anion provides the nonaqueous electrolyte secondary battery capable of attaining further preferable cycling characteristics.

In the nonaqueous electrolyte secondary battery of the invention, it is preferable that the nonaqueous electrolyte used to produce the nonaqueous electrolyte secondary battery of the invention contain $LiPF_2O_2$.

When $LiPF_2O_2$ is contained in the nonaqueous electrolyte as an additive, it reacts with lithium at the charge and discharge to form a high-quality protective covering onto the interface of the positive electrode active material and the negative electrode active material. This protective covering prevents direct reaction between an active material in a state of charge and an organic solvent, thereby preventing decomposition of the nonaqueous electrolyte and providing a nonaqueous electrolyte secondary battery that has excellent charge storage characteristics. Depending on the added amount of $LiPF_2O_2$, all of the $LiPF_2O_2$ may be consumed for forming a protective covering at the initial charge and discharge, resulting in a case in which no $LiPF_2O_2$ remains substantially in the nonaqueous electrolyte. The invention also includes this case. Thus, the invention includes any case in which the nonaqueous electrolyte of the nonaqueous electrolyte secondary battery before the initial charge contains $LiPF_2O_2$. $LiPF_2O_2$ is preferably contained in an amount of from 0.01 to 2.0 mol/L, more preferably from 0.01 to 0.1 mol/L at the time of making the nonaqueous electrolyte secondary battery.

In the nonaqueous electrolyte secondary battery of the invention, it is preferable that the positive electrode collector have a rib formed in a region facing the positive electrode substrate exposed portion and on an end on the center side of the flat winding electrode assembly, and that the negative electrode collector have a rib formed in a region facing the negative electrode substrate exposed portion and on an end on the center side of the flat winding electrode assembly.

Such a structure allows the rib to prevent scatter of spatters generated when the collector is resistance-welded to the outermost surface of a stack of a plurality of layers of the positive electrode substrate exposed portion or a stack of a plurality layers of the negative electrode substrate exposed portion. Therefore, these spatters are less likely to enter the inside of the flat winding electrode assembly, whereby a nonaqueous electrolyte secondary battery can be obtained that has excellent reliability. In addition, high heat is generated when the positive electrode collector or the negative electrode collector is welded to the positive electrode substrate exposed portion or the negative electrode substrate exposed portion. However, the rib serves as a heat releasing fin, which prevents a portion other than the welded portion of the positive electrode collector and the negative electrode collector to be melted.

BRIEF DESCRIPTION OF THE DRAWINGS

The invention will be described with reference to the accompanying drawings, wherein like numbers reference like elements.

FIG. 2A is a fragmentary sectional view along line IIA-IIA of FIG. 1A. FIG. 2B is a fragmentary sectional view along line IIB-IIB of FIG. 2A. FIG. 2C is a sectional view along line IIC-IIC of FIG. 2A.

FIG. 5A is a fragmentary sectional view of a prismatic nonaqueous electrolyte secondary battery in accordance with a modification, corresponding to FIG. 2A. FIG. 5B is a sectional view along line VB-VB of FIG. 5A.

DESCRIPTION OF EXEMPLARY EMBODIMENTS

Figure 1A:
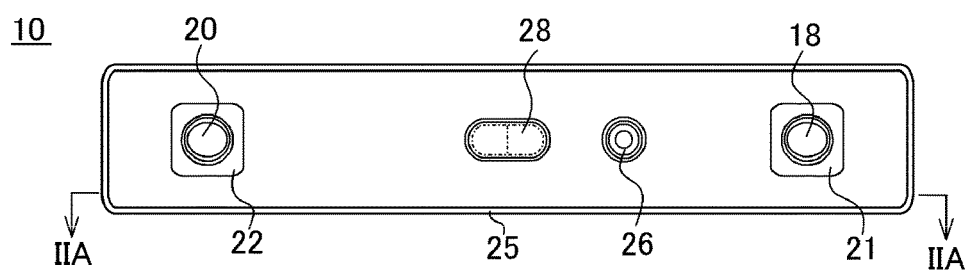
FIG. 1A is a plan view of a prismatic nonaqueous electrolyte secondary battery in accordance with an embodiment.

An embodiment of the invention will be described below in detail with reference to the accompanying drawings. However, the embodiment described below is merely an illustrative example for understanding the technical spirit of the invention and is not intended to limit the invention to the embodiment. The invention may be equally applied to various modifications without departing from the technical spirit described in the claims.

Embodiment

First, a prismatic nonaqueous electrolyte secondary battery in accordance with an embodiment will be described with reference to FIGS. 1 to 4. As shown in FIG. 4, this nonaqueous electrolyte secondary battery 10 includes a flat winding electrode assembly 14. In the electrode assembly 14, a positive electrode 11 and a negative electrode 12 are wound while being insulated from each other with a separator 13 interposed therebetween. The winding electrode assembly 14 has its outermost side covered with the separator 13 and has the negative electrode 12 disposed on a further outer side than the positive electrode 11.

Figure 3A:
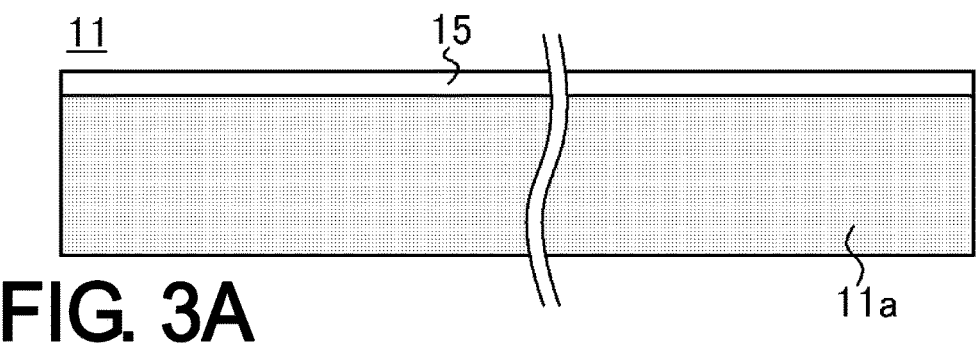
FIG. 3A is a plan view of a positive electrode used in the prismatic nonaqueous electrolyte secondary battery of the embodiment.
Figure 3B:
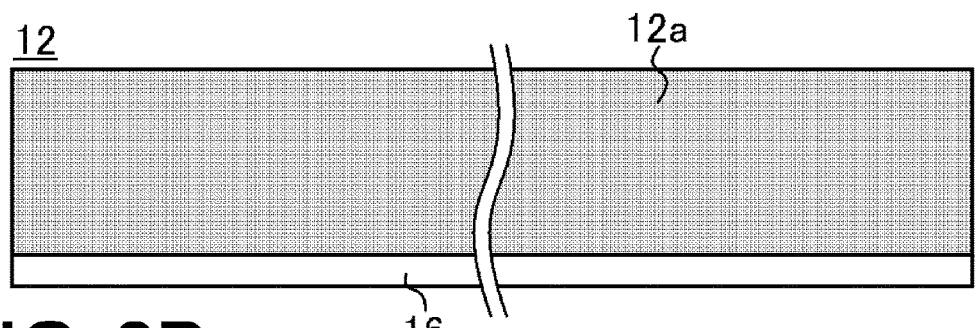
FIG. 3B is a plan view of a negative electrode thereof.
Figure 4:
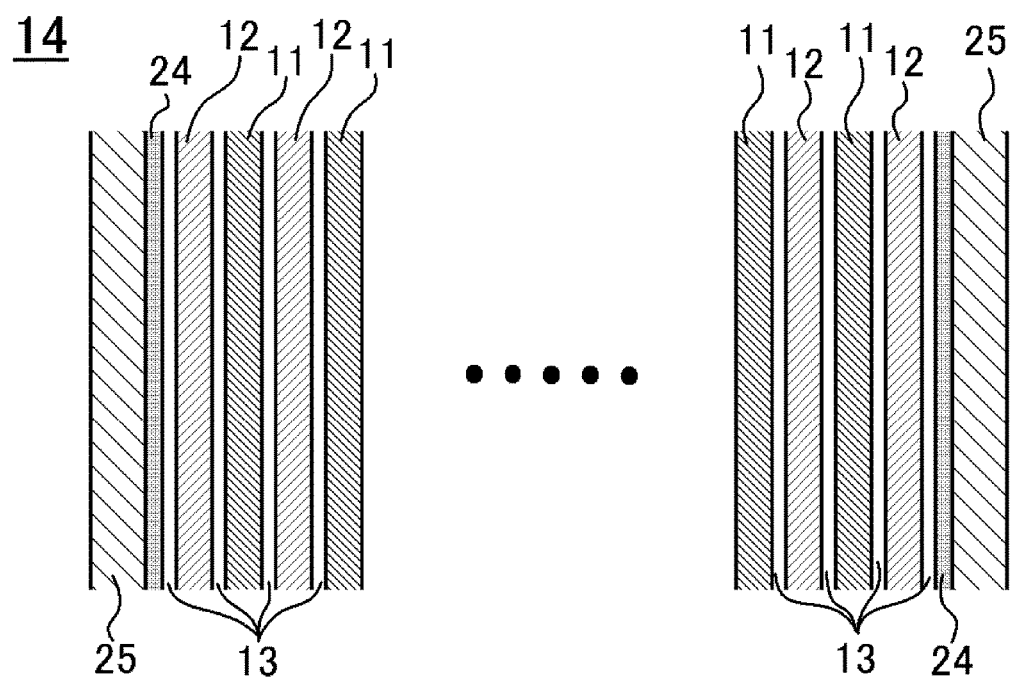
FIG. 4 is a fragmentary enlarged sectional view along line IV-IV of FIG. 2B.

As illustrated in FIG. 3A, a positive electrode 11 is produced by the following process: a positive electrode active material mixture is applied onto both sides of a positive electrode substrate of aluminum foil; the resultant object is dried and extended by applying pressure; and the positive electrode 11 is slit so as to expose the aluminum foil in a strip along the end of one side in the wide direction. The part of the aluminum foil exposed in a strip is a positive electrode substrate exposed portion 15. As illustrate in FIG. 3B, a negative electrode 12 is produced by the following process: a negative electrode active material mixture is applied onto both sides of a negative electrode substrate of copper foil; the resultant object is dried and extended by applying pressure; and the negative electrode 12 is slit so as to expose the copper foil in a strip along the end of one side in the wide direction. The part of the copper foil exposed in a strip is a negative electrode substrate exposed portion 16.

The width and length of a negative electrode active material mixture layer 12a of the negative electrode 12 are larger than those of a positive electrode active material mixture layer 11a. It is preferable that the positive electrode substrate be formed using foil of aluminum or an aluminum alloy having a thickness of about from 10 to 20 µm, while the negative electrode substrate be formed using foil of copper or a copper alloy having a thickness of about from 5 to 15 µm. A specific composition of the positive electrode active material mixture layer 11a and the negative electrode active material mixture layer 12a will be described later.

As shown in FIGS. 2A and 2B, the flat winding electrode assembly 14 having a plurality of stacked layers of the positive electrode substrate exposed portion 15 on one end and a plurality of stacked layers of the negative electrode substrate exposed portion 16 on the other end is produced by the following process: the positive electrode 11 and the negative electrode 12 produced as above are displaced so that the aluminum foil exposed portion of the positive electrode 11 and the copper foil exposed portion of the negative electrode 12 are not overlapped by the active material mixture layers of the opposing electrodes; and the positive electrode 11 and the negative electrode 12 are wound while being insulated from each other with a separator 13 interposed therebetween. A microporous polyolefin membrane is preferably used as the separator 13.

Figure 1B:
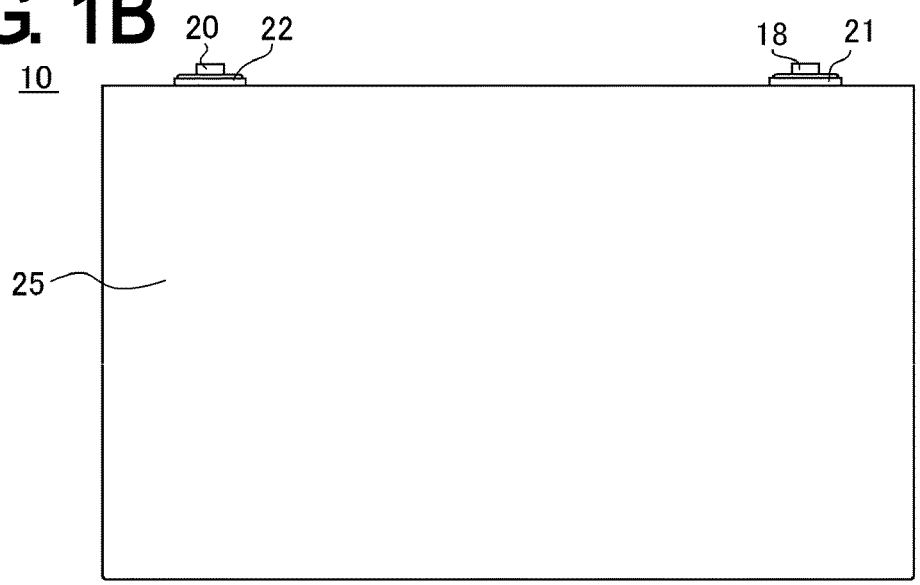
FIG. 1B is a front view thereof.

The stacked layers of the positive electrode substrate exposed portion 15 are electrically connected to a positive electrode terminal 18 of aluminum material with a positive electrode collector 17 of aluminum material interposed therebetween. Likewise, the stacked layers of the negative electrode substrate exposed portion 16 are electrically connected to a negative electrode terminal 20 of copper material with a negative electrode collector 19 of copper material interposed therebetween. As shown in FIGS. 1A, 1B, and 2A, the positive electrode terminal 18 and the negative electrode terminal 20 are fixed to a sealing plate 23 of aluminum material or other material with insulating members 21 and 22, respectively, interposed therebetween. Where appropriate, the positive electrode terminal 18 and the negative electrode terminal 20 are connected to an external positive electrode terminal and an external negative electrode terminal (neither shown in the drawings), respectively.

The flat winding electrode assembly 14 produced as above is inserted into a prismatic outer body 25 of aluminum material or other material with one side thereof open with an insulating resin sheet 24 interposed in the periphery except for the sealing plate 23 side. The sealing plate 23 is then fitted to a opening portion of the prismatic outer body 25, and a fitting portion between the sealing plate 23 and the prismatic outer body 25 is laser-welded. Moreover, a nonaqueous electrolyte is poured through an electrolyte pour hole 26, and then the electrolyte pour hole 26 is sealed. Consequently, the nonaqueous electrolyte secondary battery 10 of the embodiment 1 is produced. In the prismatic nonaqueous electrolyte secondary battery 10 of the embodiment, as shown in FIG. 4, starting from the prismatic outer body 25, the resin sheet 24, the separator 13, the negative electrode 12, the separator 13, the positive electrode 11, the separator 13, the negative electrode 12, . . . are disposed.

A current interruption mechanism 27 operated by a gas pressure generated inside the battery is provided between the positive electrode collector 17 and the positive electrode terminal 18. A gas exhaust valve 28 that is open when a gas pressure higher than the working pressure of the current interruption mechanism 27 is applied is also provided on the sealing plate 23. Therefore, the inside of the nonaqueous electrolyte secondary battery 10 is sealed. The nonaqueous electrolyte secondary battery 10 alone may be used, or a plurality of nonaqueous electrolyte secondary batteries 10 connected in series or in parallel may be used for various purposes. When a plurality of nonaqueous electrolyte secondary batteries 10 connected in series or in parallel are used, the external positive electrode terminal and the external negative electrode terminal may be provided separately to connect the respective batteries with a bus bar.

The flat winding electrode assembly 14 used in the prismatic nonaqueous electrolyte secondary battery 10 of the embodiment is used when high capacity of 20 Ah or more and high output characteristics are required. For example, the winding number of the positive electrode 11 is 43, in other words, the total number of stacked layers of the positive electrode 11 is 86. When the winding number is 30 or more, in other words, the total number of stacked layers is 60 or more, the capacity of the battery can be 20 Ah or more without increasing the size of the battery beyond necessity.

When the total number of stacked layers of the positive electrode substrate exposed portion 15 or the negative electrode substrate exposed portion 16 is large, a large amount of welding current is needed to form a weld mark 15a or 16a passing through the whole stacked layer portions of the stacked positive electrode substrate exposed portion 15 or the negative electrode substrate exposed portion 16 in resistance-welding the positive electrode collector 17 and the negative electrode collector 19 to the positive electrode substrate exposed portion 15 and the negative electrode substrate exposed portion 16, respectively.

As shown in FIGS. 2A to 2C, in the positive electrode 11, the stacked positive electrode substrate exposed portion 15 is divided into two segments, and a positive electrode intermediate member 30 is interposed therebetween. The positive electrode intermediate member 30 is formed using a resin material and holds a plurality of positive electrode conductive members 29, here, two positive electrode conductive members 29. Likewise, in the negative electrode 12, the stacked positive electrode substrate exposed portion 16 is divided into two segments, and a negative electrode intermediate member 32 is interposed therebetween. The negative electrode intermediate member 32 is formed using a resin material and holds a plurality of negative electrode conductive members 31, here, two negative electrode conductive members 31. The positive electrode collector 17 is disposed on the surfaces of both sides of the outermost side of the two segments of the positive electrode substrate exposed portion 15 that are disposed on both sides of the positive electrode conductive members 29. The negative electrode collector 19 is disposed on the surfaces of both sides of the outermost side of the two segments of the negative electrode substrate exposed portion 16 that are disposed on both sides of the negative electrode conductive members 31. The positive electrode conductive members 29 are made of aluminum material as with the positive electrode substrate, and the negative electrode conductive members 31 are made of copper material as with the negative electrode substrate. The shape of the positive electrode conductive members 29 and the negative electrode conductive members 31 may be either the same or different.

When the positive electrode substrate exposed portion 15 or the negative electrode substrate exposed portion 16 is divided into two segments, welding current needed to form a weld mark 15a or 16a passing through the whole stacked layer portion of the stacked positive electrode substrate exposed portion 15 or the negative electrode substrate exposed portion 16 is small compared to a case in which there is no division. This prevents sputtering during resistance welding, thereby preventing a trouble such as an internal short in the winding electrode assembly 14 due to the sputtering. Thus, the resistance welding is performed between the positive electrode collector 17 and the positive electrode substrate exposed portion 15 and between the positive electrode substrate exposed portion 15 and the positive electrode conductive members 29. Resistance welding is also performed between the negative electrode collector 19 and the negative electrode substrate exposed portion 16 and between the negative electrode substrate exposed portion 16 and the negative electrode conductive members 31. FIG. 2 shows two weld marks 33 formed by resistance-welding in the positive electrode collector 17 and two weld marks 34 formed by resistance-welding in the negative electrode collector 19.

FIG. 2 shows that the positive electrode collector 17 has a weld mark 33 formed at two points on both sides across the winding central position CP (the sealing plate 23 side and the bottom side of the outer body 25) by resistance-welding. FIG. 2 also shows that the negative electrode collector 19 has a weld mark 34 formed at two points on both sides across the winding central position CP. The melting area of the positive electrode substrate exposed portion 15 or the negative electrode substrate exposed portion 16 after resistance-welding is represented by the maximum value of the sectional area of a melting portion in the positive electrode substrate exposed portion 15 or the negative electrode substrate exposed portion 16 in a plane passing through the central axis of the welded connection portion and being perpendicular to the winding central axis of the winding electrode assembly 14, in other words, the maximum value of the sectional area of the weld mark. The most appropriate diameter of these melting areas is determined by the rated current for resistance welding predetermined so as to form the weld marks 15a and 16a (see FIG. 2B) where all of stacked layers of the positive electrode substrate exposed portion 15 and the negative electrode substrate exposed portion 16 are melted at the welded connection portion. The melting area of the positive electrode substrate exposed portion 15 is preferably larger than that of the negative electrode exposed portion 16.

The resistance-welding methods with the positive electrode intermediate member 30 including the positive electrode substrate exposed portion 15, the positive electrode collector 17, and the positive electrode conductive members 29, and with the negative electrode intermediate member 32 including the negative electrode substrate exposed portion 16, the negative electrode collector 19, and the negative electrode conductive members 31 in the flat winding electrode assembly 14 of the embodiment will be described in detail below. In the embodiment, the shapes of the positive electrode conductive members 29 and the negative electrode conductive members 31 may be substantially the same, and the shapes of the positive electrode intermediate member 30 and the negative electrode intermediate member 32 may be substantially the same. The resistance-welding methods are substantially the same as well. Therefore, the positive electrode 11 will be described below as an example.

The positive electrode substrate exposed portion 15 of the flat winding electrode assembly 14 produced as above is divided into two segments from the winding central part to both sides and is collected centering on a quarter of the thickness of the electrode assembly. Subsequently, the positive electrode collector 17 is provided on both surfaces on the outermost periphery side of the positive electrode substrate exposed portion 15. On the inner periphery side of the positive electrode substrate exposed portion 15, the positive electrode intermediate member 30 including the positive electrode conductive members 29 is inserted between the two segments of the positive electrode substrate exposed portion 15 so that respective projections on both sides of the positive electrode conductive members 29 are brought into contact with the positive electrode substrate exposed portion 15. For example, the positive electrode collector 17 is made of an aluminum plate that has a thickness of 0.8 mm.

The positive electrode conductive members 29 held by the positive electrode intermediate member 30 of the embodiment have projections that have, for example, a shape of a circular truncated cone and are formed on two surfaces facing each other on the cylindrical main body. As long as the positive electrode conductive members 29 are made of metal and blockish, any shape such as a cylinder, a prism, and an elliptic cylinder may be adopted. Materials made of copper, a copper alloy, aluminum, an aluminum alloy, tungsten, molybdenum, etc., may be used as a formation material of the positive electrode conductive members 29. Among the materials made of these metals, the following configurations may be adopted: the projection on which nickel plate is applied; and the projection and its base area formed of metal material that facilitates heat generation such as tungsten and molybdenum and, for example, brazed to the main body of the cylindrical positive electrode conductive members 29 made of copper, a copper alloy, aluminum, or an aluminum alloy.

A plurality of, for example, here two pieces of positive electrode conductive members 29 are integrally held by the positive electrode intermediate member 30 formed using a resin material. In such a case, the respective electrode conductive members 29 are held so as to be in parallel with each other. The positive electrode intermediate member 30 may have any shape such as a prism and cylinder. However, a landscape prism is desirable in order that the positive electrode intermediate member 30 is stably positioned and fixed between the two segments of the positive electrode substrate exposed portion 15. It is preferable that the corners of the positive electrode intermediate member 30 be chamfered in order not to hurt or deform the soft positive electrode substrate exposed portion 15 even if contacting the positive electrode substrate exposed portion 15. At least a part to be inserted between the two segments of the positive electrode substrate exposed portion 15 may be chamfered.

The length of the prismatic positive electrode intermediate member 30 varies depending on the size of the prismatic nonaqueous electrolyte secondary battery 10, but it may be from 20 mm to tens of mm. The width of the prismatic positive electrode intermediate member 30 may be as much as the height of the positive electrode conductive members 29, but at least both ends of the positive electrode conductive members 29 as welded portions may be exposed. It is preferable that both ends of the positive electrode conductive members 29 protrude from the surface of the positive electrode intermediate member 30, but the positive electrode conductive members 29 do not necessarily protrude. Such a structure enables the positive electrode conductive members 29 to be held in the positive electrode intermediate member 30, and the positive electrode intermediate member 30 to be stably positioned and disposed between the two segments of the positive electrode substrate exposed portion 15.

Subsequently, the flat winding electrode assembly 14, which includes the positive electrode collector 17 and the positive electrode intermediate member 30 holding the positive electrode conductive members 29 disposed therein, is arranged between a pair of resistance welding electrodes (not shown in the drawings). The pair of resistance welding electrodes are each brought into contact with the positive electrode collector 17 disposed on both surfaces of the outermost periphery side of the positive electrode substrate exposed portion 15. An appropriate pressure is then applied between the pair of resistance welding electrodes, thereby performing the resistance welding under predetermined certain conditions. In this resistance welding, the positive electrode intermediate member 30 is stably positioned and disposed between the two segments of the positive electrode substrate exposed portion 15, which improves the dimensional accuracy between the positive electrode conductive members 29 and the pair of resistance welding electrodes, enables the resistance welding to be performed in an accurate and stable state, and curbs variation in the welding strength.

Next, the detailed structure of the positive electrode collector 17 and the negative electrode collector 19 of the embodiment will be described with reference to FIG. 2. As shown in FIGS. 2A and 2B, the positive electrode collector 17 is electrically connected to a plurality of layers of the positive electrode substrate exposed portion 15 stacked on one side edge of the flat winding electrode assembly 14 by the resistance welding method. The positive electrode collector 17 is electrically connected to the positive electrode terminal 18. Likewise, the negative electrode collector 19 is electrically connected to a plurality of layers of the negative electrode substrate exposed portion 16 stacked on the other side edge of the flat winding electrode assembly 14 by the resistance welding method. The negative electrode collector 19 is electrically connected to the negative electrode terminal 20.

The positive electrode collector 17 is produced, for example, by punching out an aluminum plate in a particular shape and bending it. This positive electrode collector 17 has a rib 17a formed on a main body part where resistance welding is performed to a bundle of the positive electrode substrate exposed portion 15. The negative electrode collector 19 is produced, for example, by punching out a copper plate in a particular shape and bending it. This negative electrode collector 19 also has a rib 19a formed on the main body part where the resistance welding is performed to a bundle of the negative electrode substrate exposed portion 16.

The rib 17a of the positive electrode collector 17 and the rib 19a of the negative electrode collector 19 serve as a shield in order to prevent sputtering during the resistance welding from entering the inside of the flat winding electrode assembly 14, and as a radiation fin in order to prevent a portion other than the resistance welded portion of the positive electrode collector 17 and the negative electrode collector 19 from being melted by heat generated during the resistance welding. The ribs 17a and 19a are provided at a right angle from the main body of the positive electrode collector 17 and the negative electrode collector 19, respectively, but the angle need not necessarily be vertical. Even a tilt of about ±10° from the right angle brings the same function effect.

In the prismatic nonaqueous electrolyte secondary battery 10 of the embodiment, the example shows that two ribs are provided corresponding to the resistance welding position along the longitudinal direction as the rib 17a of the positive electrode collector 17 and the rib 19a of the negative electrode collector 19. However, the configuration is not limited to this case. One rib may be provided, or ribs may be formed on both sides in the width direction. When ribs are formed on both sides in the width direction, their heights may be either the same or different. If their heights are different, it is preferable that the rib around the flat winding electrode assembly 14 be provided at a higher position than the other.

The positive electrode collector 17 and the negative electrode collector 19 are each preferably disposed across the winding central position CP of the positive electrode substrate exposed portion 15 and the negative electrode exposed portion 16. The resistance-welding is preferably performed so that the positive electrode collector 17 has the weld mark 33 formed at two points on both sides across the winding central position CP (the sealing plate 23 side and the bottom side of the outer body 25; the same will apply hereinafter), and the negative electrode collector 19 has the weld mark 34 formed at two points on both sides across the winding central position CP. Such a structure allows the electrode reaction to easily proceed uniformly through the whole flat winding electrode assembly 14.

Preparation of Positive Electrode

The following describes a specific composition of the positive electrode active material mixture layer 11a and the negative electrode active material mixture layer 12a and a specific composition of the nonaqueous electrolyte used in the prismatic nonaqueous electrolyte secondary battery 10 of the embodiment. Lithium nickel cobalt manganese composite oxide represented by $LiNi_{0.35}Co_{0.35}Mn_{0.30}O_2$ was used as the positive electrode active material. This lithium nickel cobalt manganese composite oxide, carbon powder as a conductive agent, and polyvinylidene fluoride (PVdF) as a binding agent were weighed so that the mass ratio would be 88:9:3, and were mixed with N-methyl-2-pyrrolidone (NMP) as dispersion media to produce a positive electrode active material mixture slurry. This positive electrode active material mixture slurry was applied with a die coater onto both sides of the positive electrode substrate of aluminum foil whose thickness was, for example, 15 μm to form the positive electrode active material mixture layer onto both sides of the positive electrode substrate. Next, the resultant object was dried to remove NMP as an organic solvent, and was pressed with a roll press to have a particular thickness. The electrode thus obtained was slit in a particular width on one end of the electrode in the width direction along the whole longitudinal direction to form the positive electrode substrate exposed portion 15 that had no positive electrode active material mixture layer formed onto both sides, and whereby the positive electrode 11 of the structure shown in FIG. 3A was obtained.

Preparation of Negative Electrode

The negative electrode was produced as follows: 98 parts by mass of graphite powder, 1 part by mass of carboxymethylcellulose (CMC) as a thickening agent, and 1 part by mass of styrene-butadiene-rubber (SBR) as a binding agent were dispersed in water to produce a negative electrode active material mixture slurry. This negative electrode active material mixture slurry was applied with a die coater onto both sides of the negative electrode collector of copper foil whose thickness was 10 μm, and was dried to form the negative electrode active material mixture layer onto both sides of the negative electrode collector. Next, the resultant object was pressed with a press roller to have a particular thickness. The electrode thus obtained was slit in a particular width on one end of the electrode in the width direction along the whole longitudinal direction to form the negative electrode substrate exposed portion 16 that had no negative electrode active material mixture layer formed onto both sides, and whereby the negative electrode 12 of the structure shown in FIG. 3B was obtained.

Preparation of Nonaqueous Electrolyte

The nonaqueous electrolyte was produced as follows: as a solvent, ethylene carbonate (EC) and methyl ethyl carbonate (MEC) were mixed with a volume ratio (25° C. and 1 atmosphere) of 3:7; $LiPF_6$ as an electrolyte salt was added to the mixed solvent so that the concentration would be 1 mol/L; and then LiBOB as a lithium salt having an oxalate complex as an anion was further added so that the concentration would be 0.1 mol/L. The added LiBOB reacts on the surface of the negative electrode at the initial charge to form a protective covering. Therefore, in the prismatic nonaqueous electrolyte secondary battery 10 of the embodiment, all LiBOB added to the nonaqueous electrolyte is not necessarily present in the form of LiBOB.

Production of Prismatic Nonaqueous Electrolyte Secondary Battery

The negative electrode 12 and the positive electrode 11 produced as above were wound while being insulated from each other with the separator 13 interposed therebetween so as to dispose the negative electrode 12 onto the outermost periphery side. Subsequently, the resultant object was formed to be flat, and whereby the flat winding electrode assembly 14 was produced. In the flat winding electrode assembly 14, the winding numbers of the positive electrode 11 and the negative electrode 12 were 43 and 44, respectively, in other words, the numbers of stacked layers of the positive electrode 11 and the negative electrode 12 were 86 and 88, respectively, and the design capacity was 20 Ah. Furthermore, the total numbers of stacked layers of the positive electrode substrate exposed portion 15 and the negative electrode substrate exposed portion 16 were 86 and 88, respectively. This flat winding electrode assembly 14 is used to connect the positive electrode collector 17 to both sides of the outermost surface of the positive electrode substrate exposed portion 15 and to connect the negative electrode collector 19 to both sides of the outermost surface of the negative electrode substrate exposed portion 16, by resistance welding with a rated current value determined in advance. The sectional areas of the melting portion formed in the positive electrode substrate exposed portion 15 were variable, but at least 4.3 mm². The sectional areas of the melting portion formed in the negative electrode substrate exposed portion 16 were at least 2.9 mm². When the stacked layers of the substrate exposed portion are divided into two segments, the conductive member is interposed therebetween, and both ends of the conductive member are each welded and connected to the two segments of the substrate exposed portion, the sum of the sectional areas of the melting portions formed on both sides across the conductive member represents "the melting area of the positive electrode substrate exposed portion in a plane passing through the central axis of the welded connection portion and being perpendicular to the winding axis of the winding electrode assembly within the welding connection portion between the positive electrode substrate exposed portion and the positive electrode collector" and "the melting area of the negative electrode substrate exposed portion in a plane passing through the central axis of the welded connection portion and being perpendicular to the winding axis of the winding electrode assembly within the welding connection portion between the negative electrode substrate exposed portion and the negative electrode collector".

It is preferable that the positive electrode collector 17 be attached to the sealing plate 23 in advance while being electrically connected to a positive electrode terminal 18 and insulated from the sealing plate 23, and the negative electrode collector 19 be attached to the sealing plate 23 in advance while being electrically connected to a negative electrode terminal 20 and insulated from the sealing plate 23, before connecting the positive electrode collector 17 and the negative electrode collector 19 to the positive electrode substrate exposed portion 15 and the negative electrode substrate exposed portion 16, respectively.

Next, the flat winding electrode assembly 14 is inserted into the prismatic outer body 25 while being covered with the resin sheet 24. A fitting portion between the prismatic outer body 25 and the sealing plate 23 is then laser-welded to produce a prismatic nonaqueous electrolyte secondary battery that contains no nonaqueous electrolyte. Subsequently, the prismatic outer body 25 was vacuum-degassed, a particular amount of the nonaqueous electrolyte produced as above was poured through an electrolyte pour hole 26 provided to the sealing plate 23, and the electrolyte pour hole 26 was then sealed with a blind rivet, thereby preparing the prismatic nonaqueous electrolyte secondary battery 10 of the embodiment that has the structure shown in FIGS. 1 and 2. It is preferable that a spare charge be performed after pouring the nonaqueous electrolyte and before sealing the electrolyte pour hole 26.

The nonaqueous electrolyte secondary battery 10 of the embodiment can provide excellent cycling characteristics.

In the prismatic nonaqueous electrolyte secondary battery 10 of the embodiment above, an example of adding LiBOB to the nonaqueous electrolyte as an additive is shown. However, in the present invention, as the lithium salt having an oxalate complex as an anion, lithium difluoro(oxalato)borate, lithium tris(oxalato)phosphate, lithium difluoro(bisoxalato)phosphate, and lithium terafluoro(oxalato)phosphate, for example, may be used.

Modification

The nonaqueous electrolyte secondary battery 10 of the embodiment shows an example in which the stacked layers of the positive electrode substrate exposed portion 15 and the stacked layers of the negative electrode substrate exposed portion 16 are divided into two segments to interpose therebetween the positive electrode intermediate member 30 including the positive electrode conductive member 29 and the negative electrode intermediate member 31 including the negative electrode conductive member 31, respectively. However, in the invention, it is not necessary to divide the stacked layers of the positive electrode substrate exposed portion 15 or the stacked layers of the negative electrode substrate exposed portion 16 into two segments.

A prismatic nonaqueous electrolyte secondary battery 10A in accordance with a modification will be described with reference to FIG. 5, in which neither stacked layers of the positive electrode substrate exposed portion 15 nor stacked layers of the negative electrode substrate exposed portion 16 are divided into two segments and neither a positive electrode conductive member nor a negative electrode conductive member is used. In FIG. 5, like numbers are given to like components corresponding to the prismatic nonaqueous electrolyte secondary battery 10 of the embodiment shown in FIG. 2, and the detailed description thereof is omitted. In the flat winding electrode assembly 14 of the modification, a resistance welded portion between the positive electrode substrate exposed portion 15 and a positive electrode collector 17 and a resistance welded portion between the negative electrode substrate exposed portion 16 and a negative electrode collector 19 are different in formation material but are substantially similar in structure. Thus, FIG. 5B shows a side view of the positive electrode substrate exposed portion 15 as an example, and a side view of the negative electrode substrate exposed portion 16 is not shown.

In the flat winding electrode assembly 14 used in the prismatic nonaqueous electrolyte secondary battery 10A of the modification, the amounts per unit area of a positive electrode active material mixture layer 11a of the positive electrode 11 and a negative electrode active material mixture layer 12a of the negative electrode 12 are larger than those in the embodiment. The winding number of the positive electrode 11 and the negative electrode 12 are 35 and 36, respectively. In other words, the total numbers of stacking layers of the positive electrode 11 and the negative electrode 12 are 70 and 72, respectively. The design capacity is 25 Ah. Furthermore, the total numbers of stacking layers of the positive electrode substrate exposed portion 15 and the negative electrode substrate exposed portion 16 are 70 and 72, respectively. On the positive electrode 11 side, the positive electrode collector 17 is disposed on the surfaces of both sides of the outermost side of the stacked layers of the positive electrode substrate exposed portion 15. On the negative electrode 12 side, the negative electrode collector 19 is disposed on the surfaces of both sides of the outermost side of the stacked layers of the negative electrode substrate exposed portion 16. The resistance welding is performed at two points on both sides across the winding central position CP (the sealing plate 23 side and the bottom side of the outer body 25) so as to melt the whole stacked layer portion in a plurality of stacked layers of the positive electrode substrate exposed portion 15 or a plurality of stacked layers of the negative electrode substrate exposed portion 16.

In the flat winding electrode assembly 14 used in the prismatic nonaqueous electrolyte secondary battery 10A of the modification, the rib 17a formed onto the positive electrode collector 17 and the rib 19a formed onto the negative electrode collector 19 are formed over one resistance welding point.

In the prismatic nonaqueous electrolyte secondary batteries 10 and 10A of the above-mentioned embodiment and modification, a nonaqueous electrolyte contains a lithium salt having an oxalate complex as an anion such as LiBOB; however, it is preferable that the nonaqueous electrolyte also contain $LiPF_2O_2$ at the same time. $LiPF_2O_2$ also reacts with lithium at the initial charge and discharge to form a protective covering on the surface of the positive electrode and the negative electrode. This protective covering prevents direct contact between an active material in a state of charge and an organic solvent, thereby preventing decomposition of the nonaqueous electrolyte due to contact between the active material and the nonaqueous electrolyte, and improving charge storage characteristics.

The nonaqueous electrolyte secondary batteries of the embodiment and the modification each show an example in which the integrated positive electrode collector 17 or the integrated negative electrode collector 19 is connected to both of the outermost sides of the positive electrode substrate exposed portion 15 or both of the outermost side of the negative electrode substrate exposed portion 16. However, the positive electrode collector 17 or the negative electrode collector 19 may be connected to only one side of the outer utmost sides of the positive electrode substrate exposed portion 15 or of the outermost sides of the negative electrode substrate exposed portion 16, and a mere collector receiving member may be disposed on the other side.

The nonaqueous electrolyte secondary batteries of the embodiment and the modification show an example of connecting between the positive electrode substrate exposed portion 15 and the positive electrode collector 17 and between the negative electrode substrate exposed portion 16 and the negative electrode collector 19 by resistance-welding, but the connection can be made by ultrasonic welding or irradiation of high-energy rays such as a laser. Furthermore, different connections may be made on the positive electrode side and the negative electrode side.

The invention claimed is:

1. A nonaqueous electrolyte secondary battery comprising:
    a flat winding electrode assembly formed by winding a positive electrode having a rectangular shape and a negative electrode having a rectangular shape with a separator having a rectangular shape and being interposed therebetween; and
    an outer body storing the flat winding electrode assembly and a nonaqueous electrolyte,
    the flat winding electrode assembly including a positive electrode substrate exposed portion wound on one end and a negative electrode substrate exposed portion wound on the other end,
    the positive electrode substrate exposed portion having a melting area of 2.7 mm$^2$ or more in a plane passing through a central axis of a welded connection portion and being perpendicular to a winding axis of the winding electrode assembly within the welded connection portion with a positive electrode collector,
    the negative electrode substrate exposed portion having a melting area of 1.8 mm$^2$ or more in a plane passing through the central axis of the welded connection portion and being perpendicular to the winding axis of the winding electrode assembly within the welded connection portion with a negative electrode collector,
    the melting area of the positive electrode substrate exposed portion being greater than the melting area of the negative electrode substrate exposed portion,
    the winding number of the wound positive electrode substrate exposed portion being 30 or more, and the winding number of the wound negative electrode substrate exposed portion being 30 or more,
    the wound positive electrode substrate exposed portion having an outermost surface welded and connected with the positive electrode collector, and the wound negative electrode substrate exposed portion having an outermost surface welded and connected with the negative electrode collector,
    the nonaqueous electrolyte containing a lithium salt having an oxalate complex as an anion at the time of making the nonaqueous electrolyte second battery,
    all of the layers of the positive electrode substrate exposed portion being melted at the welded connection portion between the positive electrode substrate exposed portion and the positive electrode collector to be welded and connected to the positive electrode collector,
    all of the layers of the negative electrode substrate exposed portion being melted at the welded connection portion between the negative electrode substrate exposed portion and the negative electrode collector to be welded and connected to the negative electrode collector,
    the positive electrode collector is formed by using aluminum or an aluminum alloy,
    the positive electrode substrate exposed portion is formed by using aluminum or an aluminum alloy,
    the negative electrode collector is formed by using copper or a copper alloy, and
    the negative electrode substrate exposed portion is formed by using copper or a copper alloy.

2. The nonaqueous electrolyte secondary battery according to claim 1, wherein
    the welded connection portion between the positive electrode substrate exposed portion and the positive electrode collector is provided at least at one point on each of both sides across the winding central position of the flat winding electrode assembly, and
    the welded connection portion between the negative electrode substrate exposed portion and the negative electrode collector is provided at least at one point on each of both sides across the winding central position of the flat winding electrode assembly.

3. The nonaqueous electrolyte secondary battery according to claim 1, wherein
    the wound positive electrode substrate exposed portion and the wound negative electrode substrate exposed portion are each divided into two segments,
    the two segments of the wound positive electrode substrate exposed portion are disposed so that a positive electrode conductive member is arranged therebetween,
    the two segments of the wound negative electrode substrate exposed portion are disposed so that a negative electrode conductive member is arranged therebetween, and
    the melting area of the positive electrode substrate exposed portion in the plane passing through the central axis of the welded connection portion and being perpendicular to the winding axis of the winding electrode assembly within the welded connection portion with the positive electrode collector is smaller than a cross-sectional area of the positive electrode conductive member in the plane passing through the central axis of the welded connection portion and being perpendicular to the winding axis of the winding electrode assembly within the welded connection portion with the positive electrode collector.

4. The nonaqueous electrolyte secondary battery according to claim 1, wherein
    the lithium salt having the oxalate complex as an anion is contained in an amount of 0.01 to 2.0 mol/L at the time of making the nonaqueous electrolyte secondary battery.

5. The nonaqueous electrolyte secondary battery according to claim 1, wherein the lithium salt having the oxalate complex as an anion is lithium bis(oxalato)borate ($Li[B(C_2O_4)_2]$).

6. The nonaqueous electrolyte secondary battery according to claim 1, wherein
the nonaqueous electrolyte containing lithium difluorophosphate ($LiPF_2O_2$) at the time of making the nonaqueous electrolyte secondary battery.

7. The nonaqueous electrolyte secondary battery according to claim 1, wherein
a prismatic outer body having an opening portion and a bottom, storing the winding electrode assembly;
a sealing plate sealing the opening portion; and
a rib, wherein
the positive electrode collector includes a first region, a second region, a third region, a fourth region, a first bent portion, and second bent portion,
the first region is disposed between the sealing plate and the winding electrode assembly,
the first region is disposed substantially parallel to the sealing plate,
the second region extends from an end of the sealing plate toward the bottom,
the fourth region is disposed on an outer surface of the positive electrode substrate exposed portion,
the third region connects between the second region and the fourth region,
the first bent portion is formed at a boundary between the second region and the third region,
the second bent portion is formed at a boundary between the third region and the fourth region,
the melting area of the positive electrode substrate exposed portion in the plane passing through the central axis of the welded connection portion and being perpendicular to the winding axis of the winding electrode assembly within the welded connection portion with the positive electrode collector is smaller than a projected area of the rib onto a plane perpendicular to the winding axis of the winding electrode assembly by projecting in the direction of the winding axis of the winding electrode assembly, and
the rib is provided on an end on the center side of the flat winding electrode assembly of the fourth region and is substantially perpendicular to the fourth region.

8. The nonaqueous electrolyte secondary battery according to claim 1, wherein the nonaqueous electrolyte contains a lithium salt having an oxalate complex as an anion.

9. The nonaqueous electrolyte secondary battery according to claim 6, wherein the nonaqueous electrolyte contains lithium difluorophosphate ($LiPF_2O_2$).

10. The nonaqueous electrolyte secondary battery according to claim 1, further comprising:
a prismatic outer body having an opening portion, storing the winding electrode assembly;
a sealing plate sealing the opening portion; and
a rib, wherein
the positive electrode collector includes a first region, a second region, a third region, a fourth region, a first bent portion, and second bent portion,
the first region is disposed between the sealing plate and the winding electrode assembly,
the first region is disposed substantially parallel to the sealing plate,
the second region extends from an end of the sealing plate toward the bottom,
the fourth region is disposed on an outer surface of the positive electrode substrate exposed portion,
the third region connects between the second region and the fourth region, the first bent portion is formed at a boundary between the second region and the third region,
the second bent portion is formed at a boundary between the third region and the fourth region,
the melting area of the positive electrode substrate exposed portion in the plane passing through the central axis of the welded connection portion and being perpendicular to the winding axis of the winding electrode assembly within the welded connection portion with the positive electrode collector has a length in a direction perpendicular to the sealing plate shorter than that of the rib in the direction perpendicular to the sealing plate, and
the rib is provided on an end on the center side of the flat winding electrode assembly of the fourth region and is substantially perpendicular to the fourth region.

11. The nonaqueous electrolyte secondary battery according to claim 1, further comprising:
a prismatic outer body having an opening portion and a bottom, storing the winding electrode assembly;
a sealing plate sealing the opening portion; and
at least one rib, wherein
the positive electrode collector includes a first region, a second region, a third region, a fourth region, a first bent portion, and second bent portion,
the first region is disposed between the sealing plate and the winding electrode assembly,
the first region is disposed substantially parallel to the sealing plate,
the second region extends from an end of the sealing plate toward the bottom,
the fourth region is disposed on an outer surface of the positive electrode substrate exposed portion,
the third region connects between the second region and the fourth region,
the first bent portion is formed at a boundary between the second region and the third region,
the second bent portion is formed at a boundary between the third region and the fourth region,
the melting area of the positive electrode substrate exposed portion in the plane passing through the central axis of the welded connection portion and being perpendicular to the winding axis of the winding electrode assembly within the welded connection portion with the positive electrode collector has a length in a direction perpendicular to the sealing plate shorter than that of the second region in the direction perpendicular to the sealing plate, and
the rib is provided on an end on the center side of the flat winding electrode assembly of the fourth region and is substantially perpendicular to the fourth region, the length of the rib in a direction perpendicular to the sealing plate is smaller than the length of fourth region in the direction perpendicular to the sealing plate.

12. The nonaqueous electrolyte secondary battery according to claim 1, wherein the welded connection portion of the positive electrode and the welded connection portion of the negative electrode have mechanical strength substantially equivalent to each other.

13. A nonaqueous electrolyte secondary battery comprising:
a flat winding electrode assembly formed by winding a positive electrode having a rectangular shape and a negative electrode having a rectangular shape with a separator having a rectangular shape and being interposed therebetween;

an outer body storing the flat winding electrode assembly and a nonaqueous electrolyte;

a prismatic outer body having an opening portion and a bottom, storing the winding electrode assembly;

a sealing plate sealing the opening portion; and at least one rib, the positive electrode collector includes a first region, a second region, a third region, a fourth region, a first bent portion, and second bent portion, the first region is disposed between the sealing plate and the winding electrode assembly, the first region is disposed substantially parallel to the sealing plate, the second region extends from an end of the sealing plate toward the bottom, the fourth region is disposed on an outer surface of the positive electrode substrate exposed portion, the third region connects between the second region and the fourth region, the first bent portion is formed at a boundary between the second region and the third region, the second bent portion is formed at a boundary between the third region and the fourth region, the flat winding electrode assembly including a positive electrode substrate exposed portion wound on one end and a negative electrode substrate exposed portion wound on the other end, the positive electrode substrate exposed portion having a melting area of 2.7 mm$^2$ or more in a plane passing through a central axis of a welded connection portion and being perpendicular to a winding axis of the winding electrode assembly within the welded connection portion with a positive electrode collector, the negative electrode substrate exposed portion having a melting area of 1.8 mm$^2$ or more in a plane passing through the central axis of the welded connection portion and being perpendicular to the winding axis of the winding electrode assembly within the welded connection portion with a negative electrode collector, the melting area of the positive electrode substrate exposed portion being greater than the melting area of the negative electrode substrate exposed portion, the winding number of the wound positive electrode substrate exposed portion being 30 or more, and the winding number of the wound negative electrode substrate exposed portion being 30 or more, the wound positive electrode substrate exposed portion having an outermost surface welded and connected with the positive electrode collector, and the wound negative electrode substrate exposed portion having an outermost surface welded and connected with the negative electrode collector, the nonaqueous electrolyte containing a lithium salt having an oxalate complex as an anion at the time of making the nonaqueous electrolyte second battery, all of the layers of the positive electrode substrate exposed portion being melted at the welded connection portion between the positive electrode substrate exposed portion and the positive electrode collector to be welded and connected to the positive electrode collector, all of the layers of the negative electrode substrate exposed portion being melted at the welded connection portion between the negative electrode substrate exposed portion and the negative electrode collector to be welded and connected to the negative electrode collector, the melting area of the positive electrode substrate exposed portion in the plane passing through the central axis of the welded connection portion and being perpendicular to the winding axis of the winding electrode assembly within the welded connection portion with the positive electrode collector is smaller than a projected area of the rib onto a plane perpendicular to the winding axis of the winding electrode assembly by projecting in the direction of the winding axis of the winding electrode assembly, and the rib is provided on an end on the center side of the flat winding electrode assembly of the fourth region and is substantially perpendicular to the fourth region, the length of the rib in a direction perpendicular to the sealing plate is smaller than the length of fourth region in the direction perpendicular to the sealing plate.

14. The nonaqueous electrolyte secondary battery according to claim 13, wherein the melting area of the positive electrode substrate exposed portion in the plane passing through the central axis of the welded connection portion and being perpendicular to the winding axis of the winding electrode assembly within the welded connection portion with the positive electrode collector has a length in a direction perpendicular to the sealing plate shorter than that of the rib in the direction perpendicular to the sealing plate.

15. The nonaqueous electrolyte secondary battery according to claim 14, wherein the positive electrode collector is formed by using aluminum or an aluminum alloy, the positive electrode substrate exposed portion is formed by using aluminum or an aluminum alloy, the negative electrode collector is formed by using copper or a copper alloy, the negative electrode substrate exposed portion is formed by using copper or a copper alloy, and the welded connection portion of the positive electrode and the welded connection portion of the negative electrode have mechanical strength substantially equivalent to each other.

16. A nonaqueous electrolyte secondary battery comprising:

a flat winding electrode assembly formed by winding a positive electrode having a rectangular shape and a negative electrode having a rectangular shape with a separator having a rectangular shape and being interposed therebetween;

an outer body storing the flat winding electrode assembly and a nonaqueous electrolyte;

a prismatic outer body having an opening portion and a bottom, storing the winding electrode assembly; and a sealing plate sealing the opening portion, wherein the flat winding electrode assembly including a positive electrode substrate exposed portion wound on one end and a negative electrode substrate exposed portion wound on the other end, the positive electrode substrate exposed portion having a melting area of 2.7 mm$^2$ or more in a plane passing through a central axis of a welded connection portion and being perpendicular to a winding axis of the winding electrode assembly within the welded connection portion with a positive electrode collector, the negative electrode substrate exposed portion having a melting area of 1.8 mm² or more in a plane passing through the central axis of the welded connection portion and being perpendicular to the winding axis of the winding electrode assembly within the welded connection portion with a negative electrode collector, the melting area of the positive electrode substrate exposed portion being greater than the melting area of the negative electrode substrate exposed portion, the winding number of the wound positive electrode substrate exposed portion being 30 or more, and the winding number of the wound negative electrode substrate exposed portion being 30 or more, the wound positive electrode substrate exposed portion having an outermost surface welded and connected with the positive electrode collector, and the wound negative electrode substrate exposed portion having an outermost surface welded and connected with the negative electrode collector, the nonaqueous electrolyte containing a lithium salt having an oxalate complex as an anion at the time of making the nonaqueous electrolyte second battery, all of the layers of the positive electrode substrate exposed portion being melted at the welded connection portion between the positive electrode substrate exposed portion and the positive electrode collector to be welded and connected to the positive electrode collector, all of the layers of the negative electrode substrate exposed portion being melted at the welded connection portion between the negative electrode substrate exposed portion and the negative electrode collector to be welded and connected to the negative electrode collector, the positive electrode collector includes a first region, a second region, a third region, a fourth region, a first bent portion, and second bent portion, the first region is disposed between the sealing plate and the winding electrode assembly, the first region is disposed substantially parallel to the sealing plate, the second region extends from an end of the sealing plate toward the bottom, the fourth region is disposed on an outer surface of the positive electrode substrate exposed portion, the third region connects between the second region and the fourth region, the first bent portion is formed at a boundary between the second region and the third region, the second bent portion is formed at a boundary between the third region and the fourth region, the melting area of the positive electrode substrate exposed portion in the plane passing through the central axis of the welded connection portion and being perpendicular to the winding axis of the winding electrode assembly within the welded connection portion with the positive electrode collector has a length in a direction perpendicular to the sealing plate shorter than that of the second region in the direction perpendicular to the sealing plate, and the fourth region is directly connected to the positive electrode substrate exposed portion by welding.

17. The nonaqueous electrolyte secondary battery according to claim 16, wherein the melting area of the positive electrode substrate exposed portion in the plane passing through the central axis of the welded connection portion and being perpendicular to the winding axis of the winding electrode assembly within the welded connection portion with the positive electrode collector has a length in a direction perpendicular to the sealing plate shorter than that of the third region in the direction perpendicular to the sealing plate.

18. The nonaqueous electrolyte secondary battery according to claim 17, wherein
the positive electrode collector is formed by using aluminum or an aluminum alloy,
the positive electrode substrate exposed portion is formed by using aluminum or an aluminum alloy,
the negative electrode collector is formed by using copper or a copper alloy,
the negative electrode substrate exposed portion is formed by using copper or a copper alloy, and
the welded connection portion of the positive electrode and the welded connection portion of the negative electrode have mechanical strength substantially equivalent to each other.

19. The nonaqueous electrolyte secondary battery according to claim 11, wherein
the at least one rib comprises a plurality of ribs,
the plurality of ribs are separated each other in the direction perpendicular to the sealing plate.

20. The nonaqueous electrolyte secondary battery according to claim 16, further comprising:
a plurality of ribs provided on an end the center side of the flat winding electrode assembly of the fourth region, the rib is substantially perpendicular to the fourth region,
wherein the length of each of the plurality of ribs in a direction perpendicular to the sealing plate is smaller than the length of fourth region in the direction perpendicular to the sealing plate,
the plurality of ribs are separated each other in the direction perpendicular to the sealing plate.

* * * * *